Figure 9:
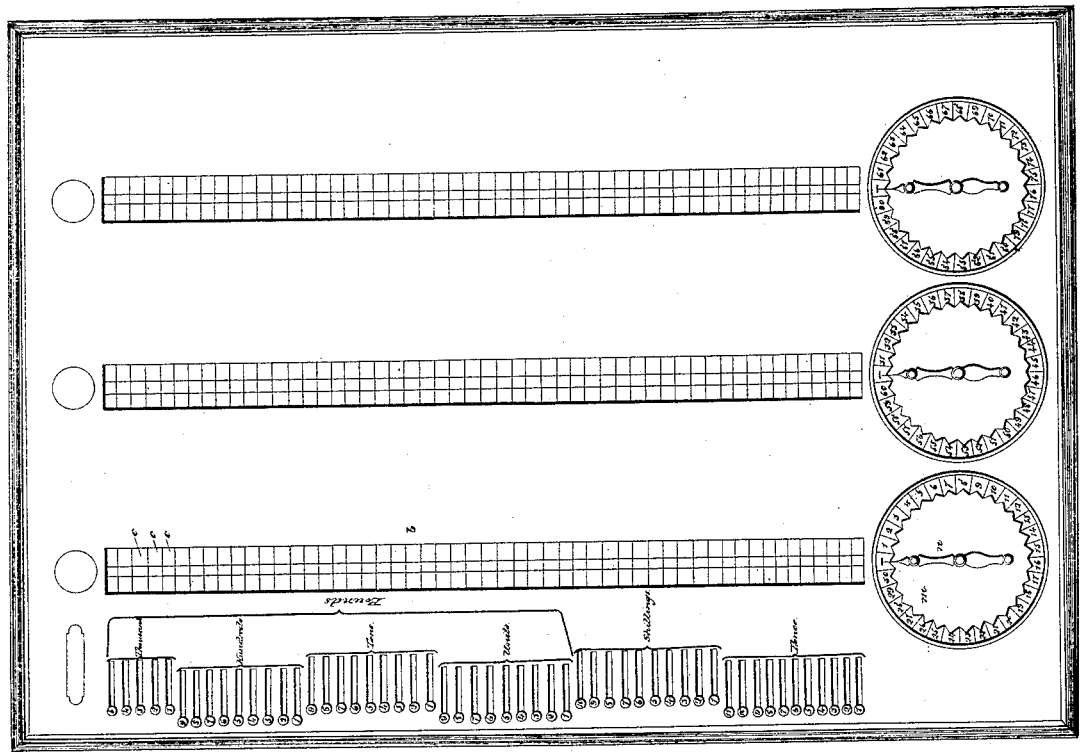

J. J. BARANOWSKI.
Reckoning Machine.
No. 5,746.
3 Sheets—Sheet 1.
Patented Sept. 5, 1848.
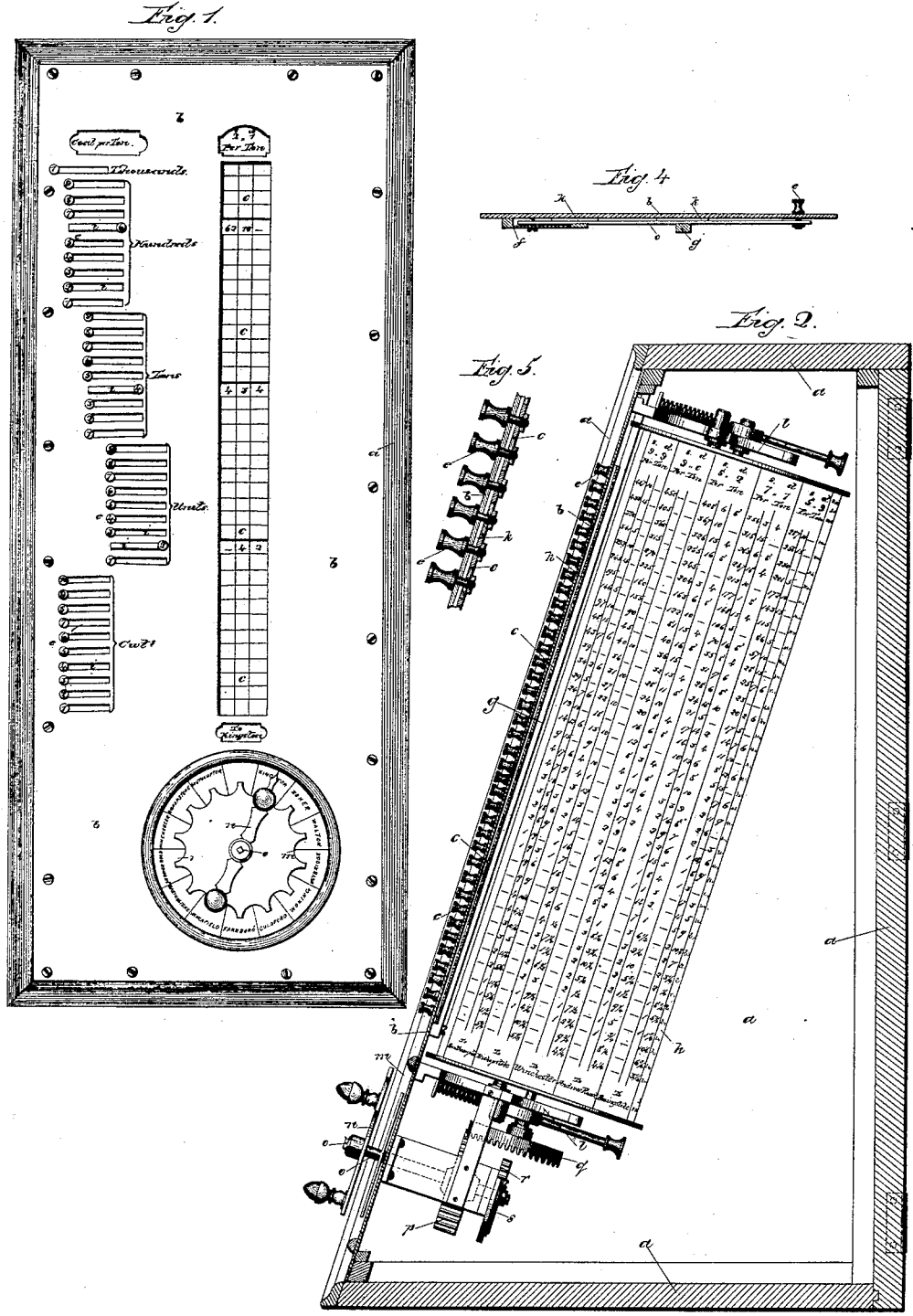

J. J. BARANOWSKI.
Reckoning Machine.
No. 5,746.
3 Sheets—Sheet 2.
Patented Sept. 5, 1848.
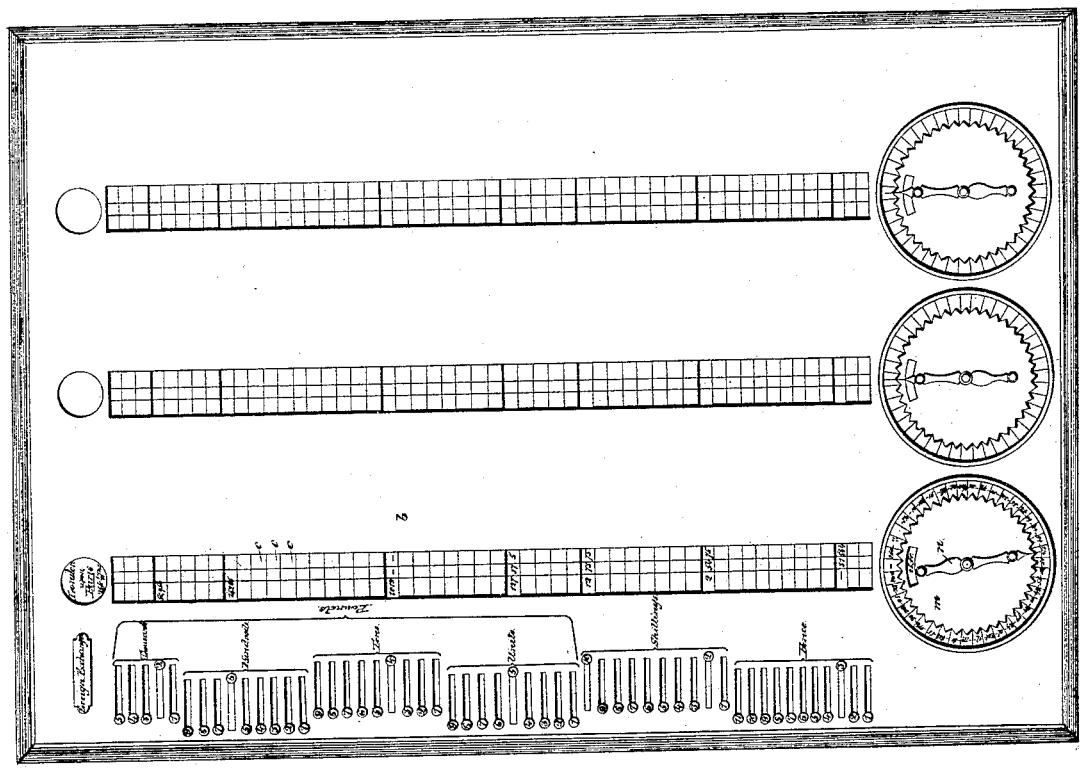
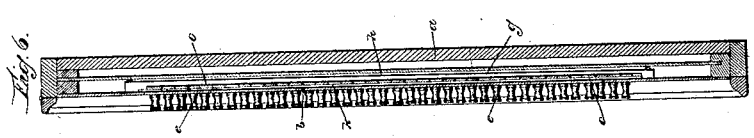
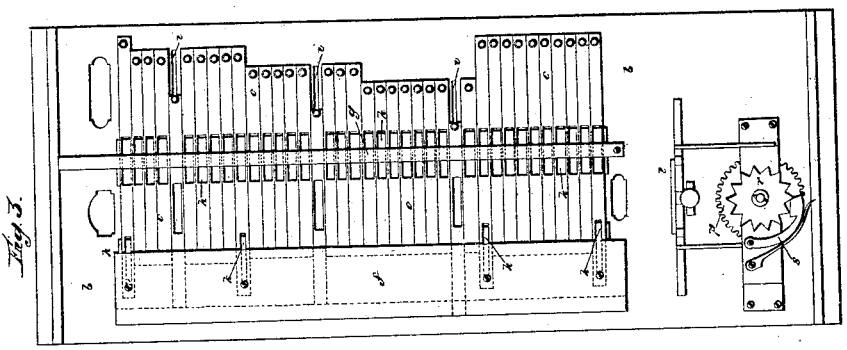

J. J. BARANOWSKI.
Reckoning Machine.

No. 5,746.   Patented Sept. 5, 1848.

3 Sheets—Sheet 3.

UNITED STATES PATENT OFFICE.

JOSEPH JEAN BARANOWSKI, OF THE KINGDOM OF POLAND, EMPIRE OF RUSSIA.

IMPROVEMENT IN CALCULATING-MACHINE.

Specification forming part of Letters Patent No. 5,746, dated September 5, 1848.

*To all whom it may concern:*

Be it known that I, JOSEPH JEAN BARANOWSKI, gentleman, of the Kingdom of Poland, a subject of the King of Poland, Emperor of Russia, have invented a Ready-Reckoning Machine; and I do hereby declare that the following is a full and exact description of my said invention.

My invention of a ready-reckoning machine has reference to certain apparatus and arrangements for ascertaining with facility the results of calculations or reckonings required to be made in various commercial and other establishments in which similar results have frequently, or from time to time, to be determined—such, for instance, as the charge for the conveyance of different loads various distances at a given rate, or the assessment of Government taxes at a given percentage, or reckonings of interest or foreign money exchanges, or amounts of wages, or other like purposes, wherein readiness and accuracy are essential, and wherein the result to be obtained is capable of being ascertained from sums or numbers previously calculated and arranged in a tabular form. The object of my invention is thus to facilitate the use of commercial tables or "ready-reckoners" by adapting thereto apparatus and arrangements so constituted as to render the operation of calculating therewith mechanically certain in place of being as now comparatively uncertain and liable to error, and this accuracy and freedom from uncertainty and error is principally insured in practice by exhibiting to the operator by simple mechanical means those sums or numbers only which are necessary to or form part of the required result. Such being generally the object in view, I would premise, for the purpose of presenting as clearly as I am able the principles upon which my invention depend, that in all calculations certain numbers must be given or known from or by means of which certain other numbers are to be found or ascertained. Thus, for example, the multiplicand and multiplier or the dividend and the divisor being given the product or quotient, respectively, are to be ascertained, and any two of the numbers multiplicand, multiplier, and product, or dividend, divisor, and quotient being given the third may be found or ascertained by well-known processes of arithmetic. Now, these numbers may be arranged in tables, and tables so arranged constitute what are known by the names of "commercial tables," "ready-reckoners," or by other similar names, and the use of such tables, as well as the liability to error in their use, are well known.

My invention of a ready-reckoning machine consists of a commercial table or ready-reckoner containing the various results previously calculated and arranged consecutively in units, tens, hundreds, &c., (as well as in fractional parts, when desired,) of suitable apparatus for bringing the numbers of such table into view, of a face-plate with openings formed in it to admit of any portion of such commercial table or ready-reckoner being seen when required, and, lastly, of a number of accurately-fitted slides, any number of which can be withdrawn for the purpose of exhibiting the numbers constituting the required result, the other numbers not required for the result to be ascertained being concealed from view. The slides and the face-plate are so adapted and arranged that the operator may readily see from the front of the machine which slide to withdraw in order to disclose any required result. The operation of the machine, then, consists in the display of the particular result required on the withdrawal of the proper slide by the operator when such result is to be exhibited by a single number or sum on the tabulated surface; but when the result is to be exhibited by or consists of two or more numbers, then two or more proper slides have to be withdrawn, by which the two or more numbers are displayed, which being added together give the final result, and the same principle is to be followed to any extent required, the machine being of course adapted to the particular kind of tabulated surface to be used with it. Thus the ascertainment of the result by means of the machine becomes reduced to the simple operation of exhibiting to view the number constituting the result required or the numbers to be added together for such result with the greatest facility. And in order that the mode of carrying my invention into effect may be fully understood, I will proceed now to describe the accompanying drawings, which exhibit my ready-reckoning machine as adapted and applied to various purposes.

The first application I shall describe is for the purpose of ascertaining the charge for the carriage of a quantity of coals different distances, the machine or instrument being supposed to be adapted to the principal existing stations on the London and Southwestern railway.

Figure 1 is a front view of the machine; Fig. 2, a vertical section of the same, taken transversely. Fig. 3 represents the slides and face-plate of the machine (which I prefer to be of metal) as they would appear when viewed from the inside, and Fig. 4 is a horizontal section of the face-plate and slides.

In all these figures similar letters of reference indicate corresponding parts.

$a\ a$ is the box or case of the machine, in which is fixed the face-plate $b$. This plate, it will be seen, has a long slot formed in it, through which a portion of the slides $c\ c$ may be seen, and when the slides are withdrawn the previously-calculated results engraved or marked upon the tabulated surface behind them are exhibited to view. The face-plate has also an opening or slot, through which may be seen the multiplicand or constant number or sum to be operated upon, which in the present instance shows the rate of charge per ton for conveying coals from London to Kingston, and likewise another opening or slot at the lower part showing the name of the station. It is manifest that any suitable information may in this manner be displayed for the guidance of the operator. The slides $c\ c$ are made to work readily between guides at the back of the face-plate $b$, and correspond in number and arrangement with the results on the tabulated surface placed behind them. Each slide has attached to it a stud or button $e$, the stem of which protrudes through a slot in the face-plate with a collar working against that plate. The stud is fixed in its place by a nut or collar in the back of the slide $c$. This will be seen most clearly on reference to the detached Fig. 5, which is a representation in vertical section, on an enlarged scale, of a few of the slides $c$ and a portion of the face-plate $b$. These slides $c\ c$ are fitted, as shown, (see Fig. 3,) one over the other, with their edges coming together, and are retained in their horizontal position by the stem of the stud or button $e$ at one end, and by resting against the edges of the slide above and below the two outside slides and two intermediate ones being supported by having a slot formed upon them, through which a pin or screw is passed into the fixed guide $f$. $g$ is another fixed guide, extending like the guide $f$ across the whole number of the slides $c$.

It will be observed on reference to Fig. 1 that each stud or button $e$ has a figure upon it, and that the whole of such studs or buttons are arranged in columns of units, tens, hundreds, &c., and fractions of units, (hundred-weights in this case,) the numbers indicated by such studs being the multipliers for the product, to be exhibited to view on the tabulated surface $h$. By this arrangement the operator can disclose any result he pleases by the withdrawal of the slide which conceals it from view, such operation being entirely mechanical, except so far as regards attention to the figures and quantities seen on the front of the machine. The extent of the slides' race is controlled by the slots $i\ i$, through which the stems of the studs or buttons $e\ e$ are passed.

$k\ k$, Fig. 3, are two pieces of cloth (colored red in the drawings for the sake of distinction) fixed onto the face-plate $b$, in order to give ease to the motion of the slides $c$ in their passage to and fro, and to prevent friction between them and the plate $b$. The tabulated surface $h$ consists of a roller of fourteen sides, on which are fixed thirteen cards—one for each station. On each single card are marked the products of the multipliers in units, tens, hundreds, &c., as well as in fractions of tons—viz., hundred-weights—into the multiplicand, which in the present instance, as shown in Fig. 1, is the rate of charge per ton for the conveyance of coals from London to Kingston.

In the drawings Fig. 2, the figures are shown on the cards sufficient to exemplify the mode in which they are arranged. The tabulated surface or roller $h$ is mounted in bearings at $l$, from which it may be easily removed, so as to allow of a change of tabulated results being placed behind the slides.

At $m$ is a dial, applied to which is an index $n$. This dial is divided out into spaces corresponding with the number of stations, and one blank space is left, as shown at Fig. 1, in order to point out through the index $n$ when the machine is at rest—that is, at the point from which the reckoning is to commence. The index $n$ forms a handle and is fitted onto the square end of the axis $o$, by which means, on turning the said index-handle, motion is communicated to the axis, and through it to the tabulated surface or roller $h$ by the wheels $p\ q$.

$r$ is a ratchet or star wheel on the axis $o$, with a number of teeth corresponding with the number of divisions on the dial $m$ and roller $h$, so that when the index-handle $n$ is turned from one division of the dial to another the index is made to point to the name of the station on the dial, and the card containing the tabulated results referring to the said station is brought into its proper position behind the slides $c$. The regulation of these movements is effected by the spring pawl or click $s$ dropping into the tooth of the wheel $r$ and retaining it, thereby preventing both the roller $h$ and index $n$ from proceeding beyond its assigned place.

Now, in order to render the operation of the machine evident, I have shown in the drawings, Figs. 1 and 3, the position of the buttons or studs $e$ and the slides $c$, when the charge for the conveyance of six hundred and forty-two tons of coals from London to Kingston is to be ascertained. It will thus be seen that the studs or buttons No. 6 in the column of hundreds, No. 4 in the column of tens, and No. 2 in the column of units have been moved along to the reverse ends of their slots in the face-plate *b*, through which their stems pass. It will also be seen on reference to Fig. 3 that the slides *c*, to which the studs or buttons are affixed, have been moved so that the spaces formed in them come opposite the long slot in the face-plate *b*, and thus the figures on the card behind are allowed to be seen, as is represented at Fig. 1. Thus all that has now to be done is to add together the three products shown and the total result is given.

Having thus described one arrangement of my invention as it might be specially adapted to the existing stations on the London and South Western Railway, it will be obvious that the names of the stations may be wholly omitted, all that is required to be brought to view being the multiplicand and the products; hence instead of the names of places being exhibited at the top and engraved around the dial-plate the sums of money constituting the multiplicand only will be necessary. Thus, suppose any quantity of materials is to be sent between two particular stations. The attendant will look to the charge per ton or other measure that may be adopted for that distance, the number indicating that charge will be brought up to view, and the slides being moved according to the number of tons the total charge will be exhibited to view, as already described. Furthermore, the above arrangement of a ready-reckoning machine is adapted for ascertaining the total amount of any transaction whereof the multiplicand consists of one of the sums of money on the table at the head of the columns of products and the multiplier is expressed in units, tens, and hundreds, and up to one thousand, inclusive, and it is obvious that the extent of such ready-reckoning machine may be increased at pleasure. It is also to be observed that the numbers to be exhibited may be dividends, divisors, and quotients instead of multiplicands, multipliers, and products, and that the arrangements above described may be applied to such purposes or to a table properly constructed, in which the multiplicands are quantities of goods and the multipliers varying rates of money, the slides being arranged according to pounds, shillings, and pence instead of units, tens, and hundreds of tons, as in the present case.

The modifications of the apparatus described above are numerous. For instance, instead of a card or series of cards or tabulated surfaces fixed on a roller mounted as shown and described, a more simple form might be adopted, if preferred, consisting merely of a flat card placed in the machine behind the slides, as shown at Fig. 6. In such case it would be necessary to insert a fresh card for each station or multiplicand or divisor, as already described. It will also be evident that any cards or tabulated surfaces whereon the results tabulated are in the relation of multiplicand, multiplier, and product, or dividend, divisor, and quotient, so that the same may be conveniently and accurately read on the withdrawal of the slides, may be adapted to and employed in my ready-reckoning machine.

Figure 7:
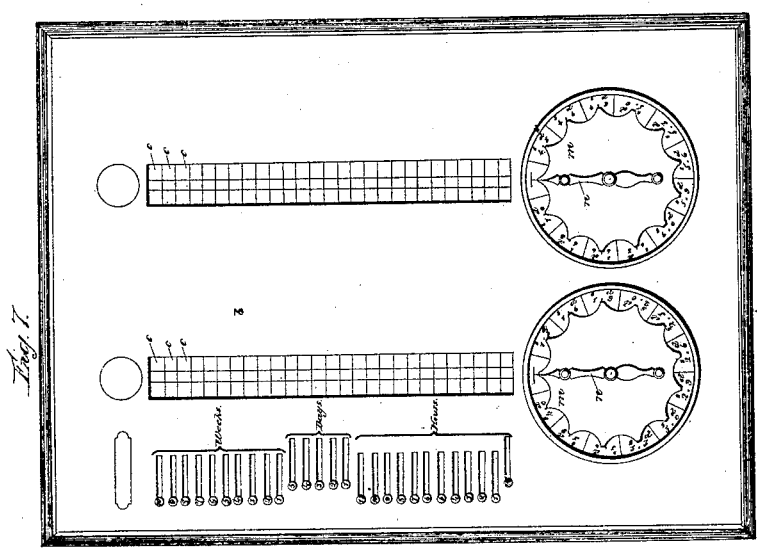

At Fig. 7 is represented in front or face view another arrangement and application of my ready-reckoning machine, which is intended to be employed for reckoning workmen's wages. In this instance the number or factor which has been called the "multiplicand" is placed upon the dial *m*, and indicates the rate of wages per day, and the number or factor which has been called the "multiplier" is contained in the series of numbers of days, weeks, and hours shown on the buttons of the slides *c* and the face-plate *b*; hence it will be evident that in order to operate with this machine the index-handle *n* must be turned to the given rate of wages per day, by which operation the corresponding tabulated surface will be brought behind the slides *c* and the required result disclosed in the same manner as above described. The mechanism for producing these movements in this machine, being the same as that already described, needs no further mention here. It will be observed that in the present instance there are two dials instead of only one, and that the slides *c* are elongated, in order to be worked, as just described, in connection with either dial. The object of this arrangement is to increase the number of multiplicands capable of being operated upon in the same machine without inconveniently increasing the diameter of the roller containing the tabulated surfaces.

Fig. 8 represents a front or face view of another arrangement and application of my ready-reckoning machine, which is intended to be employed for reckoning foreign exchanges, the exchange of London upon Paris being exhibited in the figure as an example. In this case the number or factor which has been called the "multiplicand" is marked on the dial and indicates the course of exchange of London upon Paris in all its presumable variations from the rate of twenty-five francs up to that of twenty-six francs in amounts of two and one-half centimes each, and the number or factor which has been called the "multiplier" is contained in the series of numbers in units, tens, &c., of pounds, shillings, and pence shown on the buttons of the slides *c* and face-plate *b* and intended to represent the sums to be exchanged. In order to operate with this machine, the index-handle *n* has to be turned to the given rate of exchange marked on the dial, and the required result may then be ascertained by withdrawing the proper slides, as above described. With a view, however, of rendering the use of this machine for its purpose the more evident I have shown, as an example, the mode in which the machine would indicate the exchange of two thousand six hundred and forty-five pounds sterling twelve shillings and three pence upon Paris at the exchange of twenty-five francs forty-seven and one-half centimes for one pound sterling. In order to effect this operation or reckoning, it is only necessary in the first place to point the index $n$ to that rate of exchange—that is to say, to place it upon that division in the dial which indicates 25.47½. The table relating thereto, with all the results of that exchange calculated beforehand for the whole scale of the machine by units, tens, &c., of pounds, shillings, and pence, is by such operation placed simultaneously behind the slide $c$, so that it only remains to push the several buttons $e\,e$ representing together the aforesaid sum of two thousand six hundred and forty-five pounds sterling twelve shillings and three pence, in order to bring to view immediately all the results required series by series—viz., that of

|  | Francs. | Cents. | Millièmes. |
|---|---|---|---|
| £2,000 producing | 50,950 | | |
| 600 " | 15,285 | | |
| 40 " | 1,019 | | |
| 5 " | 127 | 37 | 5 |
| 10s " | 12 | 73 | 75 |
| 2s " | 2 | 54 | 75 |
| 3d " | | 31 | 844 |
| | 67,396 | 97 | 844 | which separate items added together produce the general result, which amounts to the sum of sixty-seven thousand three hundred and ninety-six francs ninety-seven centimes and eight hundred and forty-four millièmes, equal to that which would be obtained by multiplying together by the usual process two thousand six hundred and forty-five pounds sterling twelve shillings and three pence and twenty-five francs forty-seven and one-half centimes. The mechanism for producing the said movements in this machine may be similar to that already described, the diameter of the roller containing the tabulated surfaces being suitably increased in order to include the greater number of tables upon it. The machine represented in front or face view at Fig. 8 is not, however, of suitable form to admit of its being worked by mechanism such as that described, with a roller of increased diameter; but it may be worked by employing instead thereof a fabric wound upon or passing over suitably-adjusted rollers, such fabric carrying the several previously-calculated tables, and by the aid of suitable gearing driven by the index-handle $n$ being made to present the required table behind the slides $c$. This carrying-fabric might be arranged so as to be wound and unwound upon the rollers, or it might be formed as an endless fabric passing or traveling over the rollers; but the latter I prefer, as it would obviate the necessity for springs to the rollers. By this arrangement it will be evident that an increased number of tables may be used by simply increasing the depth of the machine, so as to afford adequate space for an increased length of the carrying-fabric. The adaptation of the gearing so as to cause the carrying-fabric to pass or travel over a greater space than the index-handle $n$ is necessary in this arrangement of machine; but this is so well understood by all persons acquainted with clock-work and such like mechanism as to require no particular description.

Fig. 9 is a front or face view of a ready-reckoning machine intended to be employed for reckoning interest on different sums of money, the number or factor answering to that which has been called the "multiplicand" including in this instance both the rate per cent. and the time of interest, and the number or factor which has been called the "multiplier" being contained in the units, tens, &c., of pounds, shillings, and pence on the buttons $e$ and face-plate $b$, as before. This machine is applicable for calculations or reckonings of interest from one, two, three, four, five, six, &c., per cent., or with as many subdivisions of rates as may be desired, and for such or such number of days to run or days of interest. In order to make use of this machine it is sufficient to prepare beforehand the tables comprising the results of all these different rates of interest calculated always for the whole extent or range of the machine by units, tens, hundreds, thousands, &c., to point or mark these tables upon paper or other substance, so as to adapt them to the mechanism employed, and to have the machines furnished with dials indicating as many days as may be desired—for instance, the dials from one to thirty days, from thirty-one to sixty days, and from sixty-one to ninety days, as represented at Fig. 9, and so on successively and inclusively. The results classified in a tabular form corresponding to such or such number of days and according to the given rate of interest it is only necessary to place the index $n$ upon the division of the dial indicating the given number of days in order to place simultaneously behind the slides the table relating thereto, and so soon as it is thus placed, the only remaining operation to perform is to push the several buttons $e$, representing the principal of which the interest is required to be ascertained, in order to cause all the results sought for immediately to appear always series by series—viz., by units, tens, hundreds, thousands, &c. These respective items added together form the result required.

Having thus described the nature of my said invention, and in what manner the same is to be performed, and having pointed out some of the many various useful purposes to which such an apparatus may be applied, I would have it understood that I do not confine and limit myself to such forms and applications, inasmuch as the same will vary according to the kind of table employed and result to be indicated, and I also would have it understood that I do not claim as of my invention or the exclusive use of the slides and face-plate represented and described, except when such slides and face-plate are used in combination with a commercial table or ready-reckoner for the purposes of my said invention; but

What I claim as the invention intended to be secured to me by Letters Patent is—

A ready-reckoning machine constructed and arranged substantially as herein described, so that commercial tables or ready-reckoners may be used and read for the purposes for which they are intended by bringing into view by a simple mechanical operation such of the symbols or numbers only as are necessary for or form part of the particular calculation or result to be ascertained, the rest of the numbers on the table being at the same time concealed from view.

In witness whereof I, the said JOSEPH JEAN BARANOWSKI, have hereunto set my hand the 28th day of September, in the year of our Lord 1847.

JOSEPH JEAN BARANOWSKI.

Witnesses:
   C. J. WALLIS,
   WILLIAM SPENCE.